(12) United States Patent
Powell

(10) Patent No.: US 6,219,967 B1
(45) Date of Patent: Apr. 24, 2001

(54) NATURAL ROCK PLANTER APPARATUS

(76) Inventor: Donald R. Powell, P.O. Box 781, Elkhorn City, KY (US) 41522

( * ) Notice: Subject to any disclaimer, the term of this patent is extended or adjusted under 35 U.S.C. 154(b) by 0 days.

(21) Appl. No.: 09/097,370

(22) Filed: Jun. 15, 1998

Related U.S. Application Data
(60) Provisional application No. 60/051,551, filed on Jun. 30, 1997.

(51) Int. Cl.$^7$ .................................................. A01G 9/02
(52) U.S. Cl. ............................................ 047/65.5; 47/65.7
(58) Field of Search ................................. 47/65.5, 66.6, 47/71, 65.7, 79, 80, 81; D11/149, 151

(56) References Cited

U.S. PATENT DOCUMENTS

| | | | |
|---|---|---|---|
| D. 243,390 | * | 2/1977 | Mastrianni ........................ D11/149 |
| 1,561,824 | * | 11/1925 | H.M. Boehm ........................ 47/71 |
| 4,031,663 | | 6/1977 | Brunk . |
| 4,043,077 | | 8/1977 | Stonehocker . |
| 4,320,596 | | 3/1982 | Wirtz . |
| 4,346,532 | | 8/1982 | Peterson . |
| 4,644,686 | * | 2/1987 | Whitman ........................... 47/65.5 |
| 5,450,691 | | 9/1995 | Christie et al. . |
| 5,867,938 | * | 2/1999 | DiLernia ........................... 47/65.5 |

OTHER PUBLICATIONS

Plant Containers You Can Make, A Sunset Book, pp. 25–29, 1976.*

"Natural Stone Garden Planters", Featherock Brochure, 47/65.7, 1995.*

* cited by examiner

Primary Examiner—Michael J. Carone
Assistant Examiner—Joanne C. Downs

(57) ABSTRACT

A rock planter apparatus includes a receptacle made from rock material. The receptacle includes a top receptacle portion and a bottom receptacle portion. A plant-reception well opens at the top receptacle portion and extends downward toward the bottom receptacle portion. The plant-reception well has a well diameter. A drainage channel extends from a bottom portion of the plant-reception well through the bottom receptacle portion. The drainage channel has a channel diameter, and the well diameter is greater than the channel diameter. Preferably, the receptacle is made from natural rock material. The plant-reception well can be cylindrical in shape, and the drainage channel can also be cylindrical in shape. The rock planter apparatus of the invention can be used for receiving plants directly or for receiving potted plants. A base member can be provided upon which the receptacle can be placed. The base member can include a drainage bevel in registration with the drainage channel of the receptacle. A second plant-reception well is provided in the receptacle. The second plant-reception well opens at the top receptacle portion and extending downward toward the bottom receptacle portion. The second plant-reception well has a second well diameter. A second drainage channel extends from a bottom portion of the second plant-reception well through the bottom receptacle portion. The second drainage channel has a second channel diameter, and the second well diameter is greater than the second channel diameter.

1 Claim, 3 Drawing Sheets

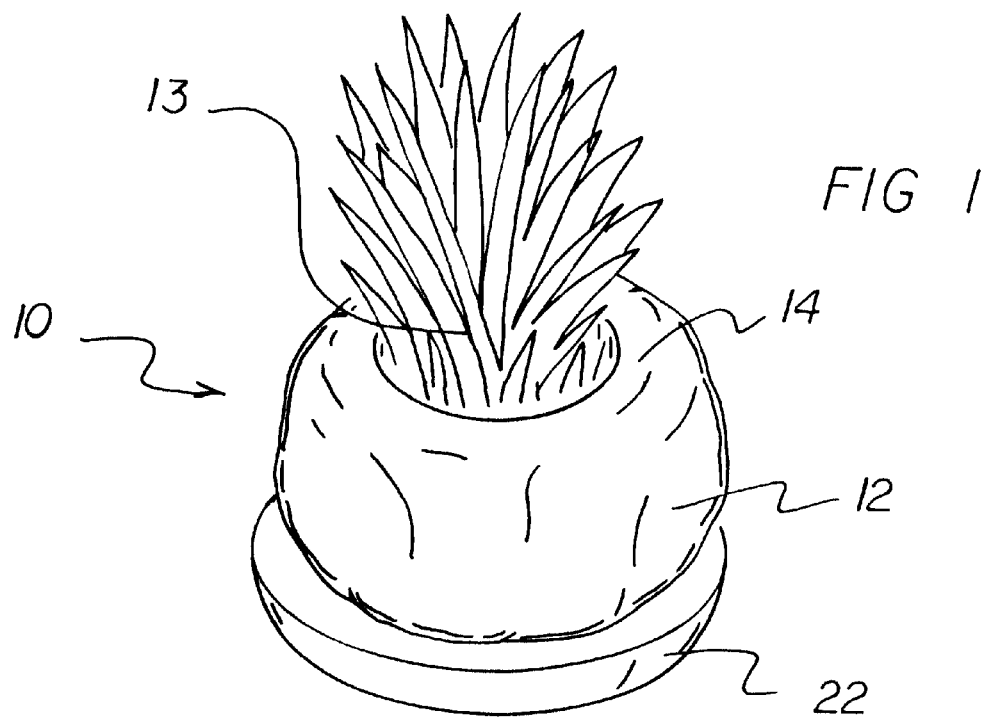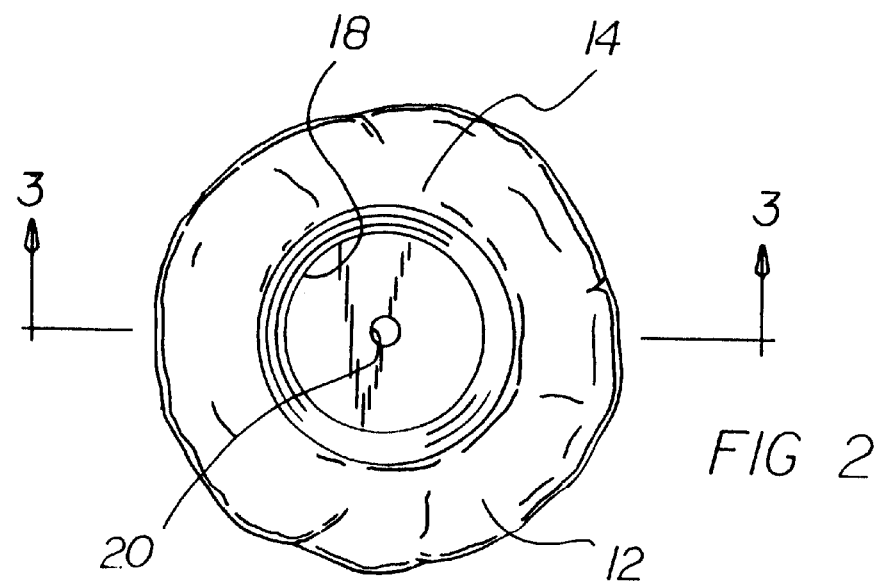

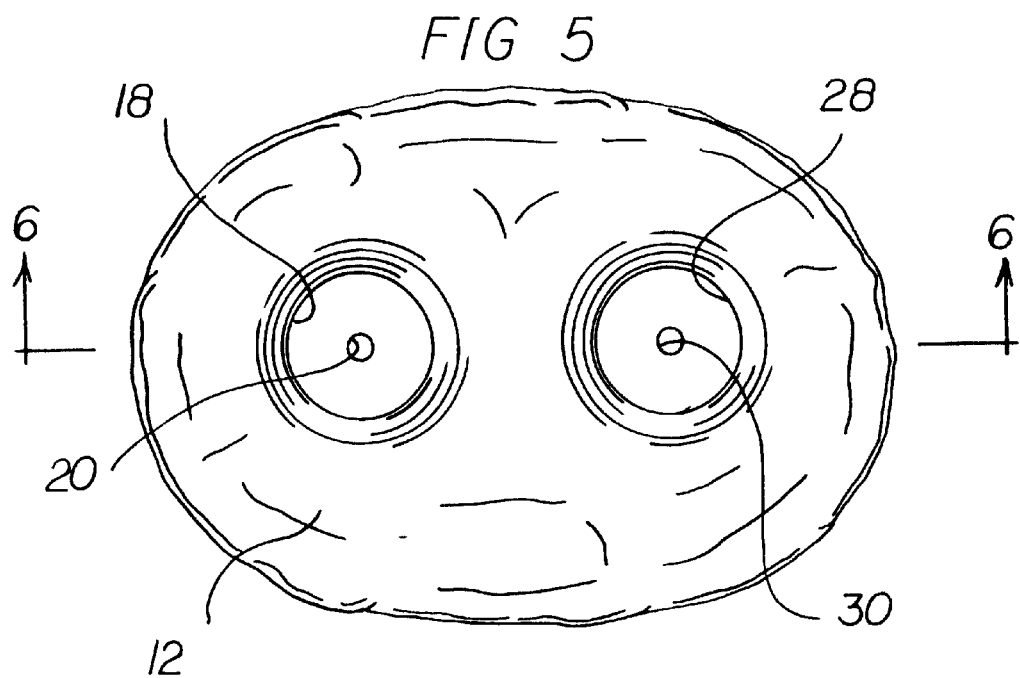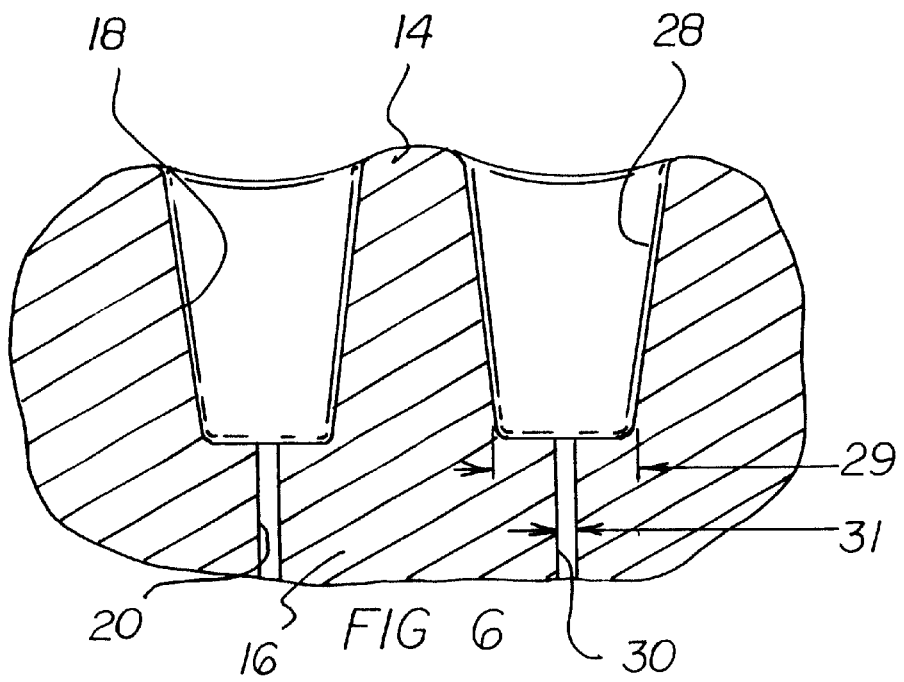

NATURAL ROCK PLANTER APPARATUS

CROSS-REFERENCE TO RELATED APPLICATION

This application claims priority based upon my prior copending Provisional Application Serial No. 60/051,551, filed Jun. 30, 1997.

BACKGROUND OF THE INVENTION

1. Field of the Invention

The present invention relates generally to plant holders and, more particularly, to plant holders in pot form which retain soil and the plant therein.

2. Description of the Prior Art

Pots for holding plants are well known and are made from a variety of materials. In this respect, the following U. S. patents disclose a number of different materials used for plant pots: 4,031,663, 4,043,077, 4,320,596, 4,346,532, and 5,450,691. More specifically, U.S. Pat. No. 4,031,663 discloses a planter made from wood. Wood is primarily an organic material and is susceptible to decomposition and destruction in the presence of moisture and microscopic organisms. In this respect, it would be desirable if a pot for plants were provided that is not made from wood.

U.S. Pat. No. 4,043,077 discloses a plant pot that includes degradable plastic, another organic material, for durability. In this respect, it would be desirable if a pot for plants were provided that is not made from degradable plastic.

U.S. Pat. No. 4,320,596 discloses a plant pot that is made from concrete. U.S. Pat. No. 4,346,532 discloses plant pots made from ceramics. U.S. Pat. No. 5,450,691 discloses a support for plants made from metal. Each of the inorganic materials concrete, ceramics, and metal may provide durability that organic materials do not provide. However, the long-range durability of such plant pots made from concrete, ceramics, and metal may not be certain. The long-range durability depends upon specific formulations of the materials and the specific conditions that were employed in making the pots from the materials. Rather than have plant pots made from materials whose durability has not been proved through the test of time, it would be desirable if a pot for plants were provided that is made from material that has proved durable over long periods of time. In addition, it would be desirable if a pot for plants were provided using natural materials that do not have to be formulated, mixed, and fabricated by man.

Still other features would be desirable in a pot for plants. For example, to assure that plants in pots are not easily tipped or blown over, it would be desirable if the pots were made from relatively dense material to provide a relatively low center of gravity of the plant/pot combination. Also, to assure that plants in the pot do not get water logged, it would be desirable if a plant pot were provided that has a drain channel in the bottom of the pot for excess water to drain out.

Thus, while the foregoing body of prior art indicates it to be well known to use pots for plants, the prior art described above does not teach or suggest a plant pot which has the following combination of desirable features: (1) is not made from wood; (2) is not made from degradable plastic; (3) is made from material that has proved durable over long periods of time; (4) uses natural materials that do not have to be formulated, mixed, and fabricated by man; (5) is made from relatively dense material; and (6) has a drain channel in the bottom of the pot for excess water to drain out. The foregoing desired characteristics are provided by the unique natural rock planter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a rock planter apparatus which includes a receptacle made from rock material. The receptacle includes a top receptacle portion and a bottom receptacle portion. A plant-reception well opens at the top receptacle portion and extends downward toward the bottom receptacle portion. The plant-reception well has a well diameter. A drainage channel extends from a bottom portion of the plant-reception well through the bottom receptacle portion. The drainage channel has a channel diameter, and the well diameter is greater than the channel diameter. Preferably, the receptacle is made from natural rock material. The plant-reception well can be cylindrical in shape, and the drainage channel can also be cylindrical in shape. The rock planter apparatus of the invention can be used for receiving plants directly or for receiving potted plants.

A base member can be provided upon which the receptacle can be placed. The base member can include a drainage bevel in registration with the drainage channel of the receptacle.

A second plant-reception well is provided in the receptacle. The second plant-reception well opens at the top receptacle portion and extends downward toward the bottom receptacle portion. The second plant-reception well has a second well diameter. A second drainage channel extends from a bottom portion of the second plant-reception well through the bottom receptacle portion. The second drainage channel has a second channel diameter, and the second well diameter is greater than the second channel diameter.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved planter apparatus which has all of the advantages of the prior art and none of the disadvantages.

It is another object of the present invention to provide a new and improved planter apparatus which may be easily and efficiently manufactured and marketed.

It is a further object of the present invention to provide a new and improved planter apparatus which is of durable and reliable construction.

An even further object of the present invention is to provide a new and improved planter apparatus which is susceptible of a low cost of manufacture with regard to both materials and labor, and which accordingly is then susceptible of low prices of sale to the consuming public, thereby making such planter apparatus available to the buying public.

Still yet a further object of the present invention is to provide a new and improved planter apparatus which is not made from wood.

Still another object of the present invention is to provide a new and improved planter apparatus that is not made from degradable plastic.

Yet another object of the present invention is to provide a new and improved planter apparatus which is made from material that has proved durable over long periods of time.

Even another object of the present invention is to provide a new and improved planter apparatus that uses natural materials that do not have to be formulated, mixed, and fabricated by man.

Still a further object of the present invention is to provide a new and improved planter apparatus which is made from relatively dense material.

Yet another object of the present invention is to provide a new and improved planter apparatus that has a drain channel in the bottom of the pot for excess water to drain out.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the natural rock planter apparatus of the invention sitting on a base and with a plant received within the planter.

FIG. 2 is a top view of the embodiment of the natural rock planter apparatus shown in FIG. 1 with the plant removed.

FIG. 5 is a top view of the embodiment of the invention shown in FIG. 4.

FIG. 6 is a cross-sectional view of the embodiment of the invention shown in FIG. 5 taken along line 6—6 thereof.

DESCRIPTION OF THE PREFERRED EMBODIMENT

With reference to the drawings, a new and improved natural rock planter apparatus embodying the principles and concepts of the present invention will be described.

Figure 3:
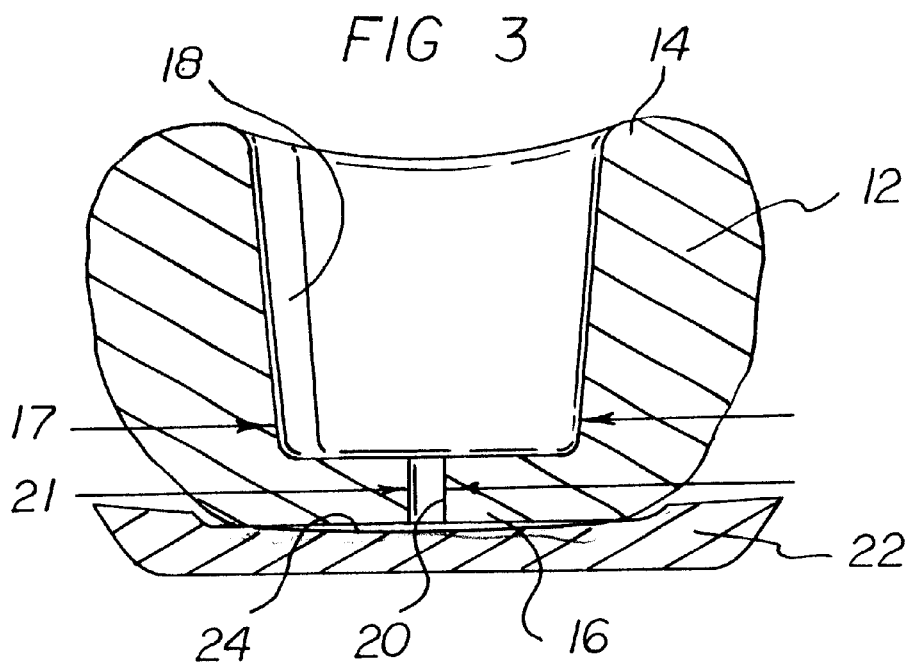
FIG. 3 is a cross-sectional view of the embodiment of the natural rock planter apparatus of FIG. 2 taken along line 3—3 thereof.

Turning to FIGS. 1–3, there is shown a first embodiment of the natural rock planter apparatus of the invention generally designated by reference numeral 10. In the first embodiment, natural rock planter apparatus 10 includes a receptacle 12 made from rock material. The receptacle 12 includes a top receptacle portion 14 and a bottom receptacle portion 16. A plant-reception well 18 opens at the top receptacle portion 14 and extends downward toward the bottom receptacle portion 16. The plant-reception well 18 has a well diameter 17. A drainage channel 20 extends from a bottom portion of the plant-reception well 18 through the bottom receptacle portion 16. The drainage channel 20 has a channel diameter 21, and the well diameter 17 is greater than the channel diameter 21. Preferably, the receptacle 12 is made from natural rock material. The plant-reception well 18 can be cylindrical in shape, and the drainage channel 20 can also be cylindrical in shape.

A base member 22 can be provided upon which the receptacle 12 can be placed. The base member 22 can include a drainage bevel 24 in registration with the drainage channel 20 of the receptacle 12.

Figure 4:
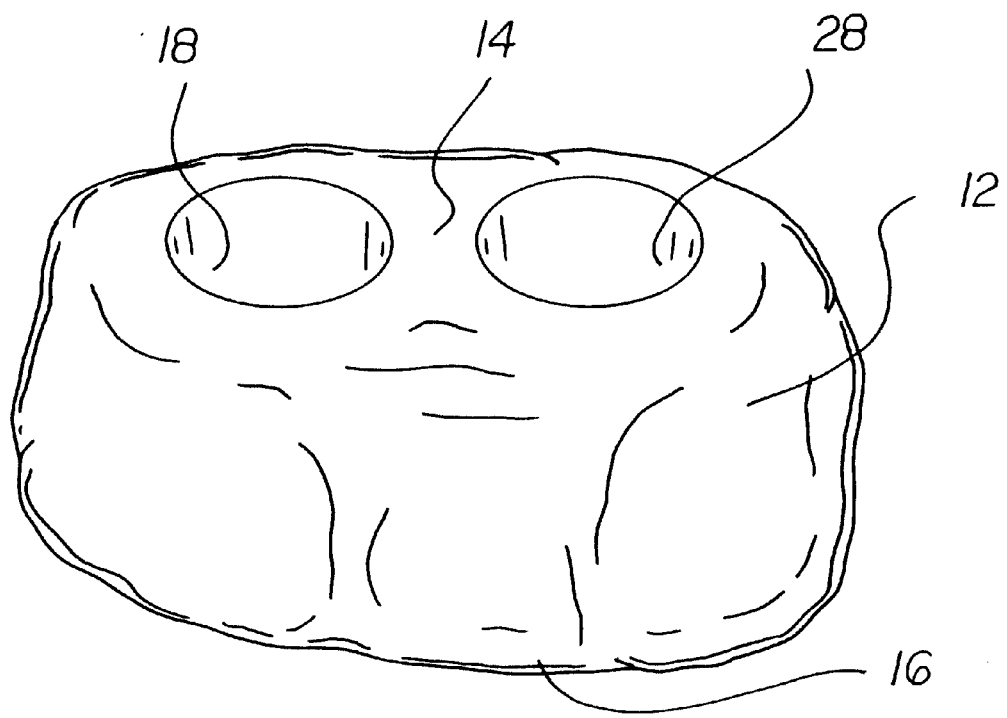
FIG. 4 is a perspective view of a second embodiment of the invention in which two plant-receiving portions are provided.

Turning to FIGS. 4–6, a second embodiment of the invention is shown. Reference numerals are shown that correspond to like reference numerals that designate like elements shown in the other figures. In addition, a second plant-reception well 28 is provided in the receptacle 12. The second plant-reception well 28 opens at the top receptacle portion 14 and extends downward toward the bottom receptacle portion 16. The second plant-reception well 28 has a second well diameter 29. A second drainage channel 30 extends from a bottom portion of the second plant-reception well 28 through the bottom receptacle portion 16. The second drainage channel 30 has a second channel diameter 31, and the second well diameter 29 is greater than the second channel diameter 31. More generally, any desired plurality of plant-reception wells and drainage channels can be employed in a receptacle 12.

The rock planter apparatus 10 of the invention can be made from natural rocks and boulders. If desired, artificial rocks can also be employed. A wide variety of different sizes and shapes can be employed. Moreover, the natural rocks and boulders that can be employed with the invention can have a wide variety of mineral content and can be from a wide variety of strata variations. Moreover, the rock planter apparatus 10 of the invention can be in a wide variety of diameters for accommodating a wide variety of planting sizes and drainage hole sizes.

There are a variety of methods for providing the plant-reception wells and the drainage channels in the rock material. More specifically, the plant-reception wells and the drainage channels can be made by drilling into the rock material. Drilling methods can includes percussion, electric, hydraulic, or manual.

The rock planter apparatus 10 of the invention can be used both indoors, for interior designs, and outdoors, for landscaping purposes. To use the rock planter apparatus 10 of the invention, either potted plants can be placed in one or more of the plant-reception wells, or plants 13 can be placed directly into the plant-reception wells.

The components of the natural rock planter apparatus of the invention are made from inexpensive and durable natural rock materials. The base can be made from other suitable materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved natural rock planter apparatus that is low in cost, relatively simple in design and operation, and which may advantageously be used without being made from either wood, degradable plastic, concrete, ceramics, or metal. With the invention, a natural rock planter apparatus is provided which is made from material that has proved durable over long periods of time. With the invention, a natural rock planter apparatus is provided which uses natural materials that do not have to be formulated, mixed, and fabricated by man. With the invention, a natural rock planter apparatus is provided which is made from relatively dense material. With the invention, a natural rock planter apparatus is provided which has a drain channel in the bottom of the pot for excess water to drain out.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A planter apparatus comprising:
   a naturally occurring rock, said rock having a top surface, a side peripheral surface and a bottom surface wherein said top surface extends above said bottom surface along an imaginary predetermined axis,
   a cylindrically shaped plant reception receptacle of a first diameter coaxial to said axis formed in said rock, said receptacle extending partially along said axis from said top surface toward said bottom surface to form a bottom surface of said plant reception receptacle spaced above said bottom surface along said imaginary axis,
   a cylindrically shaped drainage channel of a second diameter coaxial to said axis formed in said rock, said drainage channel extending from said bottom surface of said plant reception receptacle to and through said bottom surface of said rock planter wherein said second diameter is less than said first diameter, and
   a base member upon which said naturally occuring rock may be placed, wherein said base member includes a drainage bevel in registration with said drainage channel.

* * * * *